United States Patent [19]

Rambaut

[11] Patent Number: 4,837,720
[45] Date of Patent: Jun. 6, 1989

[54] SYSTEM FOR THE SUPPRESSION OF NOISE AND ITS VARIATIONS FOR THE DETECTION OF A PURE SIGNAL IN A MEASURED NOISY DISCRETE SIGNAL

[75] Inventor: Michel Rambaut, Bures-sur-Yvette, France

[73] Assignee: Commissariat a l'Energie Atomique, Paris, France

[21] Appl. No.: 845,958

[22] Filed: Mar. 31, 1986

[30] Foreign Application Priority Data

Apr. 2, 1985 [FR] France ............... 85 04977

[51] Int. Cl.$^4$ .................................. G01T 1/16
[52] U.S. Cl. .................... 364/574; 364/724.09; 364/724.1; 328/165; 378/210
[58] Field of Search .............. 364/572, 574, 579, 724, 364/571; 328/165; 377/39; 378/210; 250/370 E, 370 I

[56] References Cited

U.S. PATENT DOCUMENTS

| | | | |
|---|---|---|---|
| 3,214,700 | 10/1965 | Hook | 328/165 |
| 4,272,891 | 6/1981 | Fusari | 364/572 |
| 4,358,738 | 11/1982 | Kahn | 328/165 |
| 4,408,284 | 10/1983 | Kijesky et al. | 364/724 |
| 4,517,680 | 5/1985 | Betts et al. | 328/166 |
| 4,665,486 | 5/1987 | Schultz | 364/572 |
| 4,682,045 | 7/1987 | Amazawa et al. | 328/165 X |

OTHER PUBLICATIONS

JOURNAL NUCLEONICS, Aug. 1966, vol. 24, No. 8, pp. 118-121.
HEALTH PHYSICS, Jan. 1977, vol. 32, No. 1, pp. 1-14.
NUCLEAR INSTRUMENTS AND METHODS, Mar. 1983, vol. 206, No. 3, pp. 501-506.

*Primary Examiner*—Parshotam S. Lall
*Assistant Examiner*—Joseph L. Dixon
*Attorney, Agent, or Firm*—Oblon, Fisher, Spivak, McClelland & Maier

[57] ABSTRACT

A system for the suppression of noise and its variations for the detection of a pure signal in a measured noisy discrete signal. The system measures a counting rate $N_2$ in a signal channel and a counting rate $N_3$ in a reference channel, evaluates the estimation value $\lambda_E$ of the ratio $\lambda$ between the mean noise levels in the channels and evaluates the associated false detection probability I as a function of $(N_2, N_3\lambda_E)$. The system then performs a comparison of I with at least one information threshold $I_m$, each associated with a predetermined false detection level. Comparison can take place indirectly on a function of the probability and can use tabulated values. The system has particular application to the detection of corpuscular radiation.

7 Claims, 5 Drawing Sheets

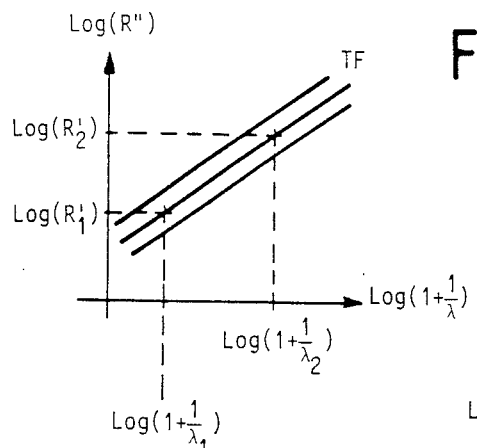
FIG. 4
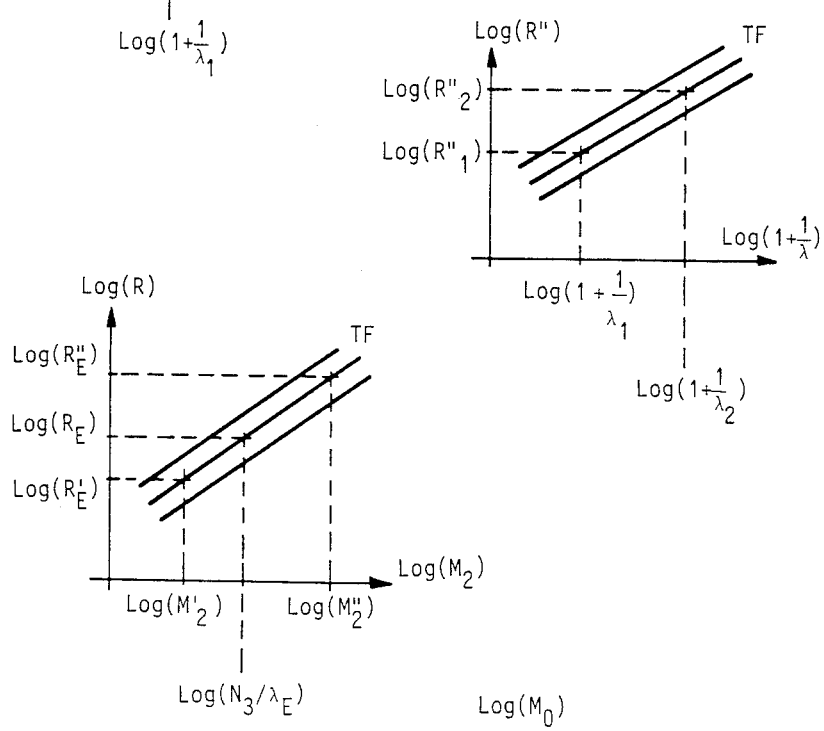
FIG. 5
FIG. 6
FIG. 7

SYSTEM FOR THE SUPPRESSION OF NOISE AND ITS VARIATIONS FOR THE DETECTION OF A PURE SIGNAL IN A MEASURED NOISY DISCRETE SIGNAL

BACKGROUND OF THE INVENTION

The present invention relates to a system for the suppression of noise and its variations for the detection of a pure signal in a measured noisy discrete signal. This system evaluates the information supplied by the measured signal. This information leads to a false detection probability, i.e. a probability of detecting a pure signal where there is not one. The information can be compared with a threshold if it is solely wished to detect the presence or absence of a pure signal, said threshold corresponding to a predetermined false detection rate. The information can also be evaluated if it is wished to known the degree of certainty of the existence of a pure signal.

The invention applies to the detection of discrete signals, i.e. signals produced by intermittent events. The invention more particularly applies to the detection of corpuscular radiation, such as neutron rays or gamma rays.

The detection of a pure signal in a measured noisy signal assumes that it is possible to eliminate the noise in said measured signal. Two cases occur, namely the mean noise level is constant and the mean noise level fluctuates. The invention relates to a detection system when the mean noise level fluctuates. As a constant mean noise level is only a special case of a fluctuating mean noise level, it follows that the system according to the invention can be used for detection purposes when the mean noise level is constant.

The detection of a particular, e.g. nuclear corpuscular radiation takes place in the presence of corpuscular noise having several causes. In the case of nuclear radiation, part of the nose is due to cosmic radiation and the other part is due to the natural radioactivity of the ground and the rocks. There is also noise which is due to the detector used. The cosmic radiation can vary over a period of time and the corpuscular noise due to the rocks and ground is essentially variable, as a function of the place where the measurement is performed. Thus, a particular radiation can only be detected on knowing the noise or at least having an adequate estimate.

The information is stored for a limited time period $\Delta T$. This information storage takes place in a discrete manner. When a particle is detected, the content of a memory is increased by one unit. In general, one or more parameters define the detected nuclear event. In the case where it only depends on a single parameter, the latter can e.g. be the energy. This is the typical case of detecting gamma radiation with the aid of an intrinsic germanium or a NaI scintillator associated with a photomultiplier. This single parameter can also be time, e.g. when measuring the flight time of a particle. The detection condition can also be a complex logic function dependent on the state of several detectors during a very short time interval, generally a few dozen nanoseconds, particularly in the case of detecting particles in a wire chamber.

Usually, to know whether a signal has been detected with the aid of a storage performed for a time interval $\Delta T$, the standard procedure is to evaluate by what value the count obtained exceeds the estimate of the available noise. This noise can in particular be evaluated during an experiment by extrapolating or interpolating the levels of the signal detected in different intervals, e.g. of an energetic type. For this purpose, it is necessary that the counting rate in the intervals where certainty exists that there is no noise is adequate in order to have an estimate of the noise probability density in the intervals where it is wished to detect a particular radiation.

Conventionally, an estimate is made as to whether there is a signal when the counting rate N measured for a period of time $\Delta T$ is such that $N > B + K \cdot \sqrt{B}$, in which B is the mean estimated noise rate and K is a constant equal to a few units. This known detection criterion is not satisfactory because it is of an empirical nature, the value of K being chosen in a non-deterministic manner on the basis of prior experiments.

An object of the invention is to supply a system for the suppression of noise and its variations for the detection of a pure signal based on a rational criterion deduced from the appearance probability laws of the noise and the expected radiation.

In the prior art, a counting rate is only taken into account if it exceeds the mean noise rate increased by a certain number of times the standard deviation $\sqrt{B}$. However, according to the invention it is considered that whenever the mean noise rate is exceeded it constitutes information concerning the presence or absence of a pure signal. This information is slight when the difference between the counting rate and the mean noise rate or level is low.

The greater the difference between the counting rate and the means noise level, the greater the amount of information supplied by the measurement and the smaller the false detection probability. The practical detection criterion of a pure signal is consequently the obtaining of adequate information, i.e. exceeding a threshold $I_m$, which is a function of a fixed false detection rate.

The information I supplied by the measurement can be exploited in two ways. It can be simply compared with the threshold $I_m$ to discriminate the presence or absence of a pure signal, whilst it is also possible to measure the difference $I - I_m$ for evaluating the degree of certainty of the presence of a pure signal.

The comparison between I and $I_m$ can take place indirectly on the false detection probability and the false detection level associated with I and $I_m$. However, the information is preferably used for the exploitation, e.g. by displaying a signal representing the information as a function of the counts.

SUMMARY OF THE INVENTION

The detection system according to the invention uses a count in a reference channel for measuring the noise and a count in the signal channel. The mean noise level $M_2$ in the signal channel is assumed to be proportional to the mean noise level $M_3$ in the reference channel. This is in accordance with an experimental finding according to which the probability density of the noise spectrum at a given energy does not vary over a period of time. $\lambda$ is the ratio between the mean noise level $M_3$ and the mean noise level $M_2$.

The detection of a pure signal in the signal channel consists of comparing the information supplied by the counting rates $N_2$ and $N_3$ of the signal channel and the reference channel for an estimated value $\lambda_E$ of the ratio $\lambda$ for a predetermined information threshold $I_m$. This threshold is defined by the fixed false detection level.

According to a preferred variant of the system according to the invention, the comparison between the information I supplied by counts $N_2$ and $N_3$ for the estimated value $\lambda_E$ of $\lambda$ and the threshold $I_m$ is replaced by a comparison between the false detection probability PF associated with said counts $N_2$ and $N_3$ for the estimated value $\lambda_E$ of $\lambda$ and the fixed false detection level TF.

According to a feature of the invention, the information function is defined by $I = -\text{Log PF}/(1-\text{PF})$; and in the same way $I_m$ is defined by $I_m = -\text{Log TF}/(1-\text{TF})$.

According to a preferred variant of the detection system according to the invention, when a function linking the mean pure signal level $M_1$ in the signal channel, the mean noise level $M_2$ in the signal channel, the mean noise level $M_3$ in the reference channel corresponding to the predetermined false detection level TF is known, said mean pure signal level $M_1$ is compared with the level estimated by $(N_2-N_3)/\lambda_E$, in which $\lambda_E$ is an estimated value of $\lambda$. This comparison produces the same result as the direct comparison between the false detection probability PF and the false detection level TF, but has the advantage of being easier to perform in practice.

In the variant which has just been described, it is assumed that a relation of type $f(TF, M_1, M_2, M_3)=0$ is known. Taking account of $\lambda=M_3/M_2$, this amounts to knowing a relation of type $g(TF, M_1, M_2, \lambda)=0$. For the counts $N_2$, $N_3$ measured during time $\Delta T$, this relation becomes $g(PF, (N_2-N_3)/\lambda_E, N_3/\lambda_E, \lambda_E)=0$ The practical use of the relation $g=0$ to decide whether a pure signal is present in the signal channel can, in certain cases, lead to long and complicated calculations. The duration of the direct calculation of the false detection probability can in particular be a function of the value of the measured counts. The duration of this calculation can in particular be incompatible with a real time detection, if the duration of each count is e.g. one second.

According to a preferred feature of the detection system according to the invention, the function g is tabulated. This makes it possible to rapidly calculated the mean pure signal level $M_1$ for comparing it with $(N_2-N_3)/\lambda_E$ or the false detection probability PF for comparing it with the false detection rate TF. The tabulation of function g has the major advantage that the calculation time of the mean pure signal level $M_1$ or the false detection probability PF is substantially independent of the measured counting values $N_2$ and $N_3$.

Function g can be tabulated for several different values of the false detection level TF. The comparison of the estimated value of signal $(N_2-N_3)/\lambda_3$ with the values of $M_1$ corresponding to each false detection rate TF makes it possible to measure the information supplied by the counts.

In the case where the function g is tabulated for a single value of the false detection rate TF, the comparison between $(N_2-N_3)/\lambda_E$ and $M_1$ locates the information I with respect to the threshold $I_m$, but does not determine the value of the information I.

The storage in table form of function g is particularly easy in the case where linear relations can be revealed between the variables of said function g or between simple functions of said variables.

Corpuscular radiation, such as neutron or gamma rays, consists of radiation for which the number of particles detected during a time interval $\Delta T$ is a random variable, whose probability density is that of Poisson's Law.

The invention notes that substantially linear relations exist between simple functions of the variables of function g in this case. In particular with $M_2$ and TF constant, Log R, in which $R=M_1/M_0$, is a substantially linear function of Log $(1+1/\lambda)$ and for $\lambda$ being infinity and TF constant, Log $(M_0)$ is a substantially linear function of log $(M_2)$ $\lambda$ is infinity when the mean noise level $M_2$ is constant and in in this particular case the mean signal level $M_1$ is designated $M_0$.

Each substantially linear relation is stored in the form of a group of pairs, so that (Log R, Log $(1+1/\lambda)$) for different values of $\lambda$. Each relation is stored for a plurality of values of $M_2$ and TF. The number of stored pairs for each relation is dependent on the linearity of said relation and the desired accuracy in the calculations. It is also dependent on the memory volume available in the system.

The storage of each linear relation is brought to two pairs of values when said relation is considered to be sufficiently linear for the intended use. This is the case when the probability density of the number of particles detected during a time interval $\Delta T$ is that of the normal distribution law. It is pointed out that the normal law is a conventional approximation of the Poisson's Law as soon as the counting rates are approximately a few dozen.

BRIEF DESCRIPTION OF THE DRAWINGS

The invention is described in greater detail hereinafter relative to non-limitative embodiments and the attached drawings, wherein:

FIGS. 4 to 6 are graphs graphically representing different steps in the determination of Log (R), as a function of the counting rate $N_3$ and the estimate $\lambda_E$ and $\lambda$, by means of stored linear relations;

FIG. 7 is a graph showing graphically the determination of Log $(M_0)$, as a function of the counting rates $N_3$ and the estimate $\lambda_E$ and $\lambda$, using stored linear relations

DETAILED DESCRIPTION OF THE PREFERRED EMBODIMENTS

Figure 1:
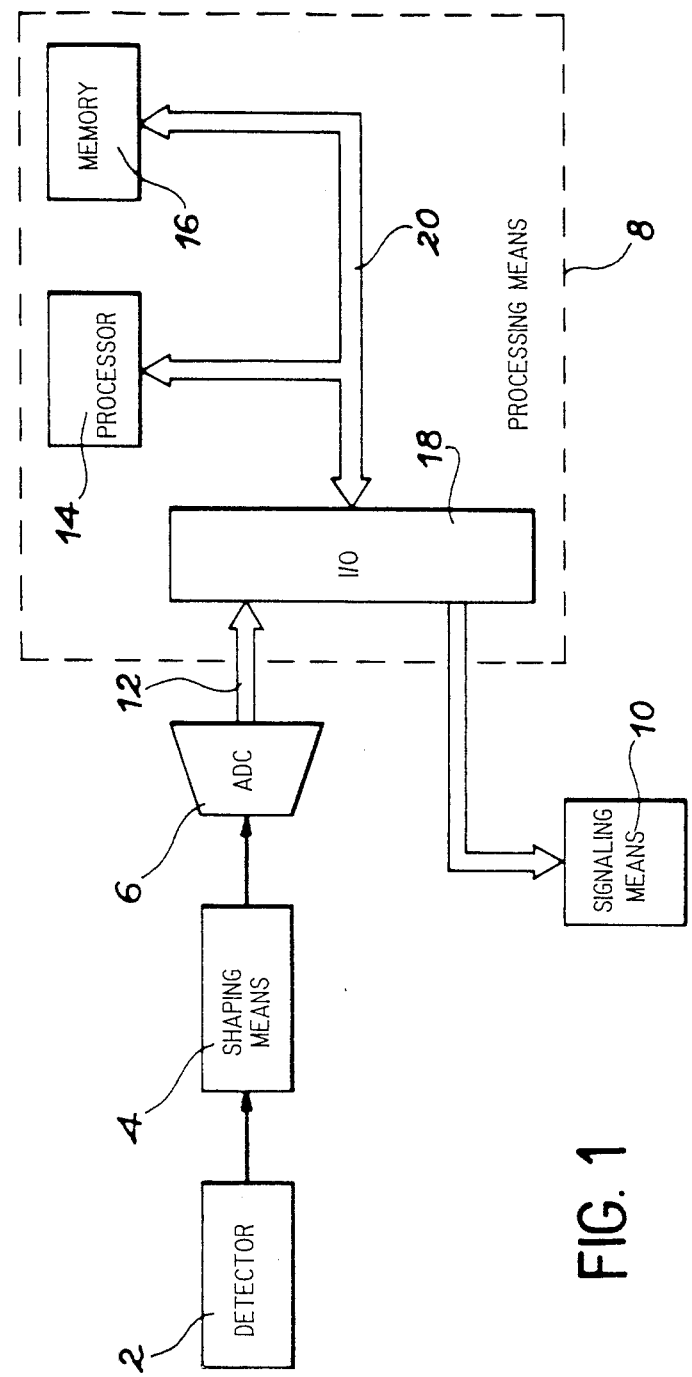
FIG. 1 is a block diagram diagrammatically representing the system according to the invention.

The system shown in FIG. 1 comprises a detector 2, a shaping means 4, an analog-digital converter 6, a processing means 8 and a signalling means 10.

Detector 2 produces an output dependent on the radiation to be detected. For the detection of gamma rays, the detector 2 can be an intrinsic germanium or a NaI scintillator associated with a photomultiplier. For the detection of neutrons, the detector is e.g. a He3 counter.

Detector 2 supplies a voltage pulse for each detected event. This pulse is received by the shaping means 4. It can in particular comprise in series an amplifier, a shaping circuit and a discriminator.

The analog-digital converter 6 is positioned down stream of the shaping means 4. It converts the amplitude of the pulse received into a binary signal, having e.g. eight bits in the case of a NaI scintillator or twelve bits in the case of an intrinsic germanium. This binary signal is transmitted to the processing meams 8 by a channel 12.

Processing means 8 comprises a processor 14, at least one memory 16 and an input-output circuit 18. These components are connected by a channel 20 having address lines, data lines and control lines.

The signalling means 10 is controlled by processor 14 across the input-output circuit 18 and a channel 22. It can in particular comprise visual and sound alarm means, which are triggered when a pure signal is detected, in the case where the information I is compared with a single threshold $I_m$. They supply the value of the information I if the latter is estimated by comparison with several different thresholds.

The system functions in the following way. Each pulse supplied by the detector is, as a function of its amplitude, taken into account in the signal channel or in the reference channel, or it is ignored. This can be carried out by a not shown, multichannel analyzer. Following each count of duration $\Delta T$, the processor reads the counting rates $N_2$ and $N_3$ stored and corresponding to the number of pulses in the signal channel and in the reference channel, evaluates the value $\lambda_E$ of the ratio between the mean noise levels $M_3$ and $M_2$ in the reference channel and signal channel and compares the false detection probability PF associated with the counting rates $N_2$ and $N_3$ and with the estimate $\lambda_E$ and $\lambda$, with a predetermined false detection level TF, or a function of said false detection probability and a function of the predetermined false detection rate, whereby said function can be the information.

The value $\lambda_E$ of the ratio $\lambda$ can be periodically readjusted, e.g. following each count, or determined once and for all if it is possible to accept that the experimental conditions make it possible to consider it as being constant. In the latter case, the estimated value $\lambda_E$ or $\lambda$ is the mean value of p values of the ratio between the counting rates $N_3$ and $N_2$, in which p is an integer, said counts being performed in the absence of any particular radiation. In the case where the estimated value $\lambda_E$ of $\lambda$ is readjusted after each count, said estimate $\lambda_E$ can be taken equal to the mean of the p values of $\lambda$, associated with the p counts preceding that in which it is wished to detect a pure radiation, said counts being assumed to be carried out when there is nor pure radiation present. The choice of p is dependent on the speed of the variations $\lambda$. If p too low, $\lambda_E$ will change rapidly when a signal appears, whereas if $\lambda_E$ is too high, the signal may no longer be detectable. If p is too high, $\lambda_E$ is no longer a good estimate and the estimate can be incorrect at the time of the count.

A description will now be given in exemplified manner of the operation of the system according to the invention for the detection of corpuscular radiation. The probability density of the number of detected particles is that of Poisson's Law.

The probability that a radiation exists, no matter whether store $N_2$ does or does not contain an event due to it is, with $M_3$ constant:

$$P_1 = e^{-M_2} \cdot \sum_{j=0}^{j=N_2} \frac{M_2^j}{j!} \quad (1)$$

Moreover, the probability that $M_3$ is between $M_3$ and $M_3 + dM_3$:

$$P_2 = \frac{e^{-M_3} \cdot \frac{(M_3)^{N_3}}{N_3!} \cdot dM_3}{\int_0^\infty e^{-M_3} \cdot \frac{(M_3)^{N_3}}{N_3!} \cdot dM_3} \quad (2)$$

The probability of absence of a pure radiation, or the probability of false detection is the:

$$PF = \int_{\{\lambda \cdot N_2\}}^{\infty} P_1 \cdot P_2,$$

in which { } means "integer part of", i.e. by using $\lambda M_2 = M_3$ $$PF = \sum_{J=N_2+1}^{\infty} \left( \frac{\lambda^{N_3+1}}{(1+\lambda)^{J+N_3+1}} \cdot \frac{(J+N_3)!}{J!/N_3!} \cdot Y \right) \quad (3)$$

with $Y = e^{-(1+\lambda)\cdot N_2} \cdot \sum_{K=0}^{K=J+N_3} \frac{((1+\lambda) \cdot N_2)^K}{K!}$ (4)

(In equation 3, $\lambda$ is replaced by $\lambda_E$ (estimation of $\lambda$).)

The false detection rate TF is obtained by replacing in the expression of PF:

$$N_2 \text{ by } \{M_1\}+\{M_2\} \; N_3 \text{ by } \{M_3\} \quad (5)$$

in which { } signifies "integer part of". Taking account of $\lambda = M_3/M_2$, this relation is of form $g(TF, M_1, M_2, \lambda) = 0$.

As stated hereinbefore, when the probability density of the number of detected events follows Poisson's Law, it is possible to reveal substantially linear relations between simple functions of the variables TF, $M_1$, $M_2$ and $\lambda$. This makes it possible to store in tabular form the function g and determine substantially without calculation the mean signal level $M_1$ corresponding to a predetermined false detection level TF, for a noise level $M_2$ and a ratio $\lambda_E$ of an estimated nature and to compare said mean signal level $M_1$ with the estimated level equal to $(N_2-N_3)/\lambda_E$.

If the function g is tabulated for several values of TF, the information can be evaluated by calculating the values of $M_1$ corresponding to each TF, for an estimated noise level $M_2$ and an estimated ratio $\lambda_E$, then by investigatng the values $M'_1$ and $M''_1$ surrounding the estimated value $(N_2-N_3)/\lambda_E$. These mean signal values $M'_1$ and $M''_1$ correspond to false detection levels TF' and TF'', and consequently to informations I' and I''. These two values constitute the lower and upper values of the information I supplied by counts $N_2$ and $N_3$ for the estimated value $\lambda_E$ of $\lambda$.

Figure 2:
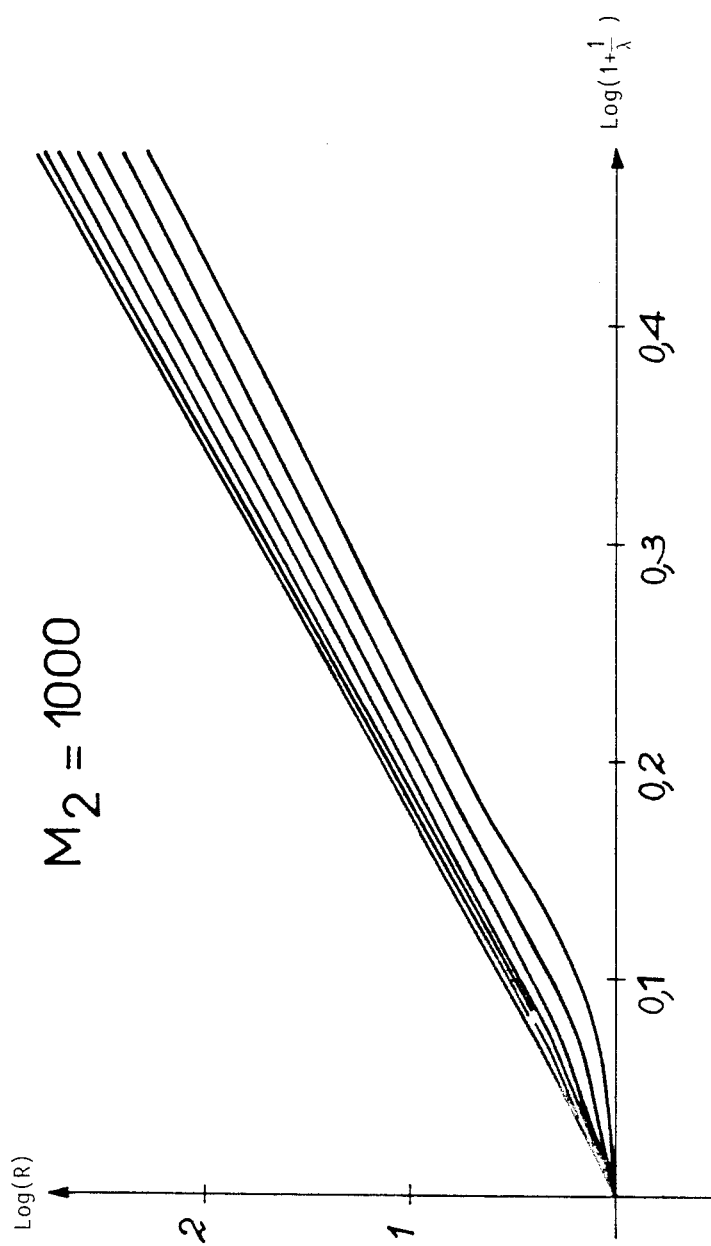
FIG. 2 is a graph showing graphically the relation between Log (R) and Log $(1+1/\lambda)$ for different values of TF, for a value of $M_2=1000$, in the case where the probability density of the number of particles detected is that Poisson's law.

FIG. 2 illustrates the substantially linear relation linking with the fixed $M_2$, Log R and Log $(1+(1)/\lambda)$, in which $R = M_1/M_0$. $M_0$ is the mean signal level in the case where the mean noise level $M_2$ is known, which corresponds to infinity giving:

$$PF = e^{-M_2} \cdot \sum_{J=0}^{N_2} \frac{M_2^J}{J!} \qquad (6)$$

The false detecton rate or level TF is obtained by replacing the counting rate N by $\{M_0\}+\{M_2\}$, hence the relation $g(TF, M_0, M_2)=0$.

The graph of FIG. 2 consists of a group of parallel straight lines, each corresponding to one value of TF. An identical graph can be prepared for each value of $M_2$.

The storage of all the straight lines is not necessary. It would only be necessary to store the line e.g. corresponding to $TF=10^{-3}, 10^{-4}, 10^{-5}$ and $10^{-6}$. For each of the lines to be stored, at least two pairs of points must be stored. This number could be increased if it is considered that the linearity is inadequate.

The stored table must have at least two graphs associated with two values of $M_2$. More specifically, said first table comprises $k_1.k_2.k_3$ pairs of points (Log R, Log $(1+(1)/\lambda)$) on using $k_1$ values of $M_2$, $k_2$ values of TF and $k_2$ points per line.

Figure 3:
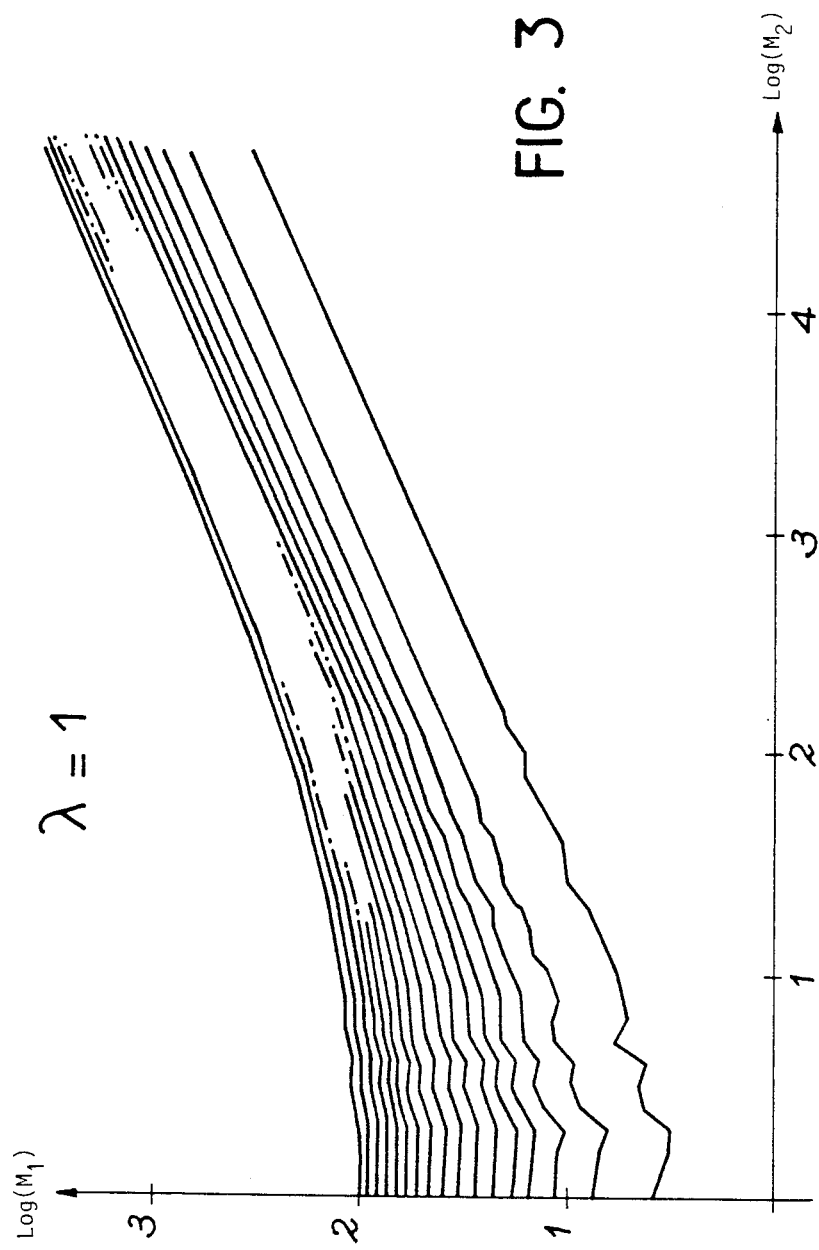
FIG. 3 is a graph showing graphically the relation between Log $(M_1)$ and Log $(M_2)$ for different values of TF, for a value of equal to unity, in the case where the probability density of the number of detected particles is that of Poisson's Law.
Figure 8:
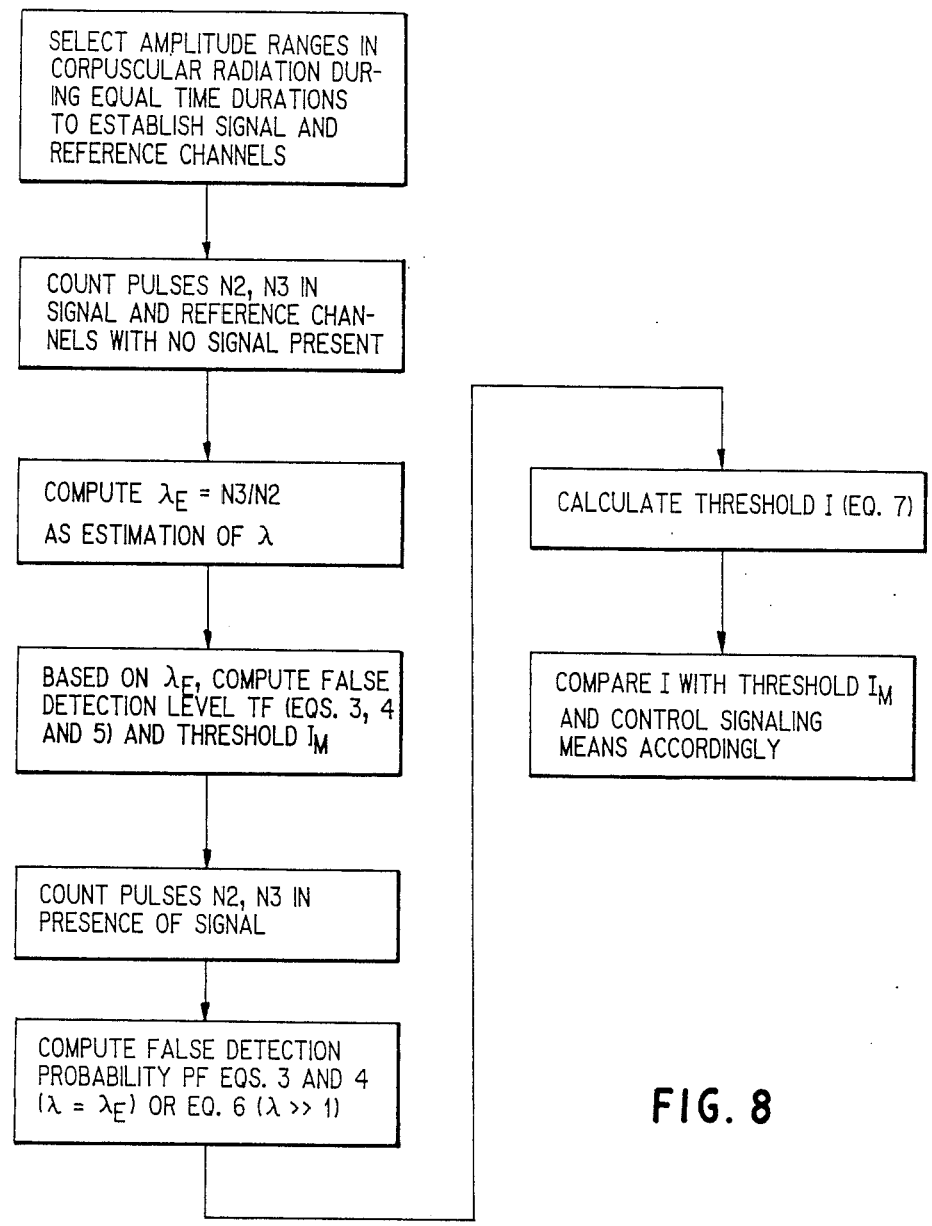
FIG. 8 is a schematic flow chart showing steps performed in the operation of the present invention.

FIG. 3 is a graph showing the substantially linear relation between Log $(M_1)$ and Log $(M_2)$, with $\lambda$ fixed. This graph consists of a group of straight lines, each corresponding to one value of TF. The graph corresponding to $\lambda$ infinity represents the substantially linear relation between Log $(M_0)$ and Log $(M_2)$. This graph has a configuration similar to that of FIG. 3.

For detection purposes according to the invention, a second table is prepared having $k_4.k_5$. pairs of points (Log $(M_0)$, Log $(M_2)$), in which $k_4$ is the number of considered values of TF and $k_5$ the number of points per stored line, $k_5$ being at least equal to 2 for each line.

With the first and second tables prepared and representing the function $g(TF, M_1, M_2, \lambda)=0$, the detection according to the invention involves the following successive operations.

With the counting rates $N_2$ and $N_3$ measured, an estimate is made of the value $\lambda_E$ of the ratio $\lambda$, e.g. in the manner indicated hereinbefore, and an estimate is made of the mean noise levels $M_2$ by the ratio of $N_3/\lambda_E$ (because $M_2=M_3/\lambda$ and $N_3$ is an estimate of $M_3$).

It is now necessary to compare the mean signal level $M_1$, defined by the predetermined false detection level TF and the estimated values $M_2$ and $\lambda_E$, with the mean measured signal level equal to $(N_2-N_3)/\lambda_E$. The two tables make it possible to obtain $M_1$ with a minimum of calculation. The obtaining of $M_1$ is illustrated by FIGS. 4 to 7. This value of $M_1$ results from a double interpolation (or extrapolation); an interpolation or extrapolation on $\lambda$ with $M_2$ constant and then an interpolation or extrapolation on $M_2$, said interpolations or extrapolations using the first table.

The value $\lambda_1$ and $\lambda_2$ of the first table are chosen to be close to the estimate $\lambda_E$, e.g. surrounding the estimate $\lambda_E$, with the values $M'_2$ and $M''_2$ of the first table close to the estimate $M_2$, e.g. surrounding said estimate $M_2$.

This is followed by calculation by reading in the first table of pairs (Log $(R'_1)$, Log $(1+1/\lambda_1)$) and (Log $(R'_2)$, Log $(1+1/\lambda_2)$) and by simple linear interpolation (if $\lambda_1$ and $\lambda_2$ surround $\lambda_E$) or by linear extrapolation, Log $(R'_E)$ as a function of Log $(1+1/\lambda_E)$ with $M_2$ constant, as indicated in the graph of FIG. 4 in the case of linear interpolation. In the same way Log $(R''_E)$ is obtained as a function of Log $(1+1/\lambda_E)$ with $M''_2$ constant, as indicated in the graph of FIG. 5 in the case of linear interpolation.

By performing a linear interpolation (if $M'_2$ and $M''_2$ surround $M_2$) or a linear extrapolation on the line defined by the pairs or points (Log $(R'_E)$, Log $(M'_2)$) and (Log $(R''_E)$, Log $(M''_2)$), it is possible to deduce the value Log (R) associated with the estimate Log $(N_2/\lambda_3)$ of Log $(M_2)$—FIG. 6.

Moreover, by linear interpolation or extrapolation of the values Log $(M'_0)$ and Log $(M''_0)$ given by the second table and corresponding to the abscissa Log $(M'_2)$ and Log $(M''_2)$, it is possible to obtain the value Log $(M_0)$ corresponding to the estimate Log $(N_3/\lambda_E)$ of Log $(M_2)$—FIG. 7.

From Log (R) and Log $(M_0)$, it is possible to deduce $M_1$ by the relation Log $(M_1)=$Log $(R)+$Log $(M_0)$.

The value $M_1$ is then compared with its estimate $(N_2-N_3)/\lambda_E$. If $M_1$ exceeds $(N_2-N_3)/\lambda_E$, it is considered that the counting rate $N_2$ is solely due to noise. In the opposite case, it is considered that a pure signal has been detected.

The comparison between the value $M_1$ of the mean signal level given by the table and the estimated value $(N_2-N_3)/\lambda_E$ is identical to the comparison between the false detection rate TF and the false detection probability PF, or between the information threshold $I_M$ and the information I supplied by the counts for the estimated value $\lambda_E$ of .

The comparison between the estimated value $(N_2-N_3)/\lambda_E$ and a single value of $M_1$, defined by a predetermined false detection level TF realises one detection per threshold, a pure signal being present if the threshold is traversed, whilst there is no pure signal if the threshold is not traversed.

As has been stated, the information can be evaluated in a more quantitative manner. This information evaluation uses the sequence of operations defined hereinbefore, which are repeated for several values of TF, e.g. $10^{-3}, 10^{-4}, 10^{-5}, 10^{-6}$. Thus, the system determines several values of the mean signal level $M_1$, each associated with a false detection level, i.e. with an information level.

The information I supplied by the counts is between informations I' and I'' corresponding to the mean noise levels $M'_1$ and $M''_1$ defined by $$M'_1 \leq (N_2-N_3)/\lambda_E \leq M''_1.$$

The information is defined according to the invention by the relation $$I = -\text{Log } PF/(1-PF) \qquad (7).$$

As the false detection probability is generally below $10^{-3}$, said relation is in practice translated by $I = -$Log PF.

Thus, information I normally has a value of a few units for a logarithm base equal to 10. The graphic representation of the information I as a function of the number of the count, i.e. finally as a function of the time, then constitutes a particularly clear and representative visual display for an operator.

What is claimed is:

1. A system for the suppression of noise and its variations for the detection of a pure signal in a measured discrete noisy signal, comprising:

a detector for converting radiation received into electrical pulses;
a shaping means coupled to the detector for shaping signals produced at an output of the detector;
an analog-digital converter coupled to said shaping means for converting analog output signals from said shaping means to digital signals;
a processor means coupled to the analog-digital converter for processing said digital signals; and
a signaling means for signaling results of processing performed by said processing means;
said processing means comprising a processor, at least one memory and an input-output circuit;
wherein the processor sequences the selection of two identical time durations $\Delta t$ in a selected range of frequential and spatial spectrums of corpuscular radiation, one range where radiating signal is present constituting a signal channel, the other range where there is only noise constituting a reference channel;
wherein the detector receives the radiation signal from the signal channel having a mean noise level $M_2$ and delivers a first pulse at each detection of radiation signal, each said pulse being transformed and converted by the analog-digital converter and counted by the processor, to produce a sum which constitutes a counting rate $N_2$, wherein $N_2$ gives an estimation of the mean noise level $M_2$, $N_2$ being stored in the memory;
wherein the detector receives radiation in the reference channel having a mean noise level $M_3$ and delivers a second pulse at each such detection, each said second pulse being transformed and converted by the analog-digital converter and counted by the processor to produce a sum which constitutes a counting rate $N_3$, wherein $N_3$ gives an estimation of the mean noise level $M_3$, $N_3$ being stored in the memory;
wherein the processor performs the following steps:
computation of the ratio $\lambda_E = N_3/N_2$ which represents an estimation of $\lambda$ defined as the ratio of $M_3/M_2$,
computation of the false detection rate TF, according to the following relationships, $$TF = \sum_{j=(\{M_1\}+\{M_2\}+1)}^{\infty} \left( \frac{\lambda_E^{\{M_3\}+1}}{(1+\lambda_E)^{j+\{M_3\}+1}} \cdot \frac{(j+\{M_3\})!}{j!\{M_3\}!} \cdot Y_1 \right)$$

where $Y_1 =$ $$e^{-(1+\lambda_E)\cdot(\{M_1\}+\{M_2\})} \cdot \sum_{k=0}^{k=j+\{M_3\}} \frac{((1+\lambda_E)\cdot(\{M_1\}+\{M_2\}))^k}{k!},$$

$\{M_1\}$ = the integer part of $(N_2 - N_3)/\lambda_E$, and
$\{M_2\}$ = the integer part of $N_2$;

computation of a threshold $I_m$ where $I_m = -\log(TF/(1-TF))$;

computation of the probability of false detection PF according to the following relationships, $$PF = \sum_{j=N_2+1}^{\infty} \left( \frac{\lambda_E^{N_3+1}}{(1+\lambda)^{j+N_3+1}} \cdot \frac{(j+N_3)!}{j!/N_3!} \cdot Y \right)$$

where $Y = e^{-(1+\lambda_E)\cdot N_2} \cdot \sum_{k=0}^{k=j+N_3} \frac{((1+\lambda_E)\cdot N_2)^k}{k!}$;

computation of a threshold I, where $I = -\log(PF/(1-PF))$, and comparison of I and $I_m$,
control of the signaling means as a function of the result of said comparison of I and $I_m$.

2. A system according to claim 1, wherein a relation $g(TF, M_1, M_2, \lambda) = 0$ is tabulated in the memory.

3. A system according to claim 1, wherein:
the mean noise level $M_2$ is known and memorized;
$M_0$ is a mean pure signal level when the noise is constant, log $M_0$ being a linear function of log $M_2$, log $(M_1, M_0)$ being a substantially linear function of log $(1+1/\lambda_E)$;
the memory contains a first table and a second table, said first table comprising, for each value of TF between a group of $k_1$ values and for each value of $M_2$ between a group of $k_2$ values, at least two pairs (log $M_1/M_0$, log $(1+1/\lambda_E)$), said table comprising, for each value of TF taken from among the group of $k_1$, at least two pairs (log $M_0$, log $M_1$); and
the processor calculates, after each measurement and for at least one value of TF, log $(M_1/M_0)$ corresponding to the ratio $\lambda_E$ estimated by the interpolation of extrapolation of the values contained in the first table, then log $M_0$ corresponding to the mean noise level $M_2$ estimated by the interpolation or extrapolation of the values contained in the second table, and compares the estimated means signal level $(N_2-N_3)/\lambda_E$ with at least one means signal level $M_1$, defined by the calculated values log $M_1/M_0$ and log $M_0$.

4. A system according to claim 3, wherein the memory comprises first and second tables for several values of TF, the processor calculating the means signal level $M_1$ for several values of TF and estimating the false detection probability by surrounding it by the two value of TF corresponding to the two values of $M_1$ surrounding the estimate $(N_2-N_3)/\lambda_E$.

5. A system according to claim 1, wherein the processor estimates a value $\lambda_E$ for $\lambda$ by the mean between the ratios $N_3/N_2$ of a sequence of several counts, said counts being performed in the absence of a signal.

6. A system according to claim 5, wherein the estimated value $\lambda_E$ of $\lambda$ is periodically updated.

7. A system according to claim 1 wherein the estimated value $\lambda_E$ of $\lambda$ is periodically updated.

* * * * *